(12) United States Patent
Westbrook et al.

(10) Patent No.: US 11,370,142 B2
(45) Date of Patent: Jun. 28, 2022

(54) WHEELED SAW SUPPORT APPARATUS

(71) Applicants: Dennis Westbrook, Weatherford, TX (US); D Vincent West, Bella Vista, AR (US)

(72) Inventors: Dennis Westbrook, Weatherford, TX (US); D Vincent West, Bella Vista, AR (US)

(*) Notice: Subject to any disclaimer, the term of this patent is extended or adjusted under 35 U.S.C. 154(b) by 126 days.

(21) Appl. No.: 16/929,476

(22) Filed: Jul. 15, 2020

(65) Prior Publication Data
US 2022/0016799 A1    Jan. 20, 2022

(51) Int. Cl.
| B27B 5/10 | (2006.01) |
| B23D 47/02 | (2006.01) |
| B25H 1/18 | (2006.01) |
| B62B 3/02 | (2006.01) |
| B62B 3/04 | (2006.01) |
| B62B 3/10 | (2006.01) |

(52) U.S. Cl.
CPC ............... *B27B 5/10* (2013.01); *B23D 47/02* (2013.01); *B25H 1/18* (2013.01); *B62B 3/022* (2013.01); *B62B 3/04* (2013.01); *B62B 3/10* (2013.01); *B62B 2202/48* (2013.01)

(58) Field of Classification Search
CPC .. B27B 5/10; B23D 47/02; B25H 1/18; B62B 3/022; B62B 3/04; B62B 3/10; B62B 2202/48
See application file for complete search history.

(56) References Cited

U.S. PATENT DOCUMENTS

| D293,983 | S | 2/1988 | Aldridge | |
| 4,969,496 | A | 11/1990 | Romans | |
| 6,360,797 | B1 | 3/2002 | Brazell | |
| 6,530,583 | B1* | 3/2003 | Mueller | B23D 47/025 144/286.5 |
| 6,578,856 | B2 | 6/2003 | Kahle | |
| 7,213,829 | B2 | 5/2007 | Wu | |
| 7,374,184 | B2 | 5/2008 | Worthy | |
| D595,324 | S | 6/2009 | Wu | |
| 8,424,576 | B1* | 4/2013 | Coyner | B27C 9/02 144/3.1 |
| 8,448,956 | B2 | 5/2013 | Wise | |
| 9,975,564 | B2* | 5/2018 | Cook | B62B 1/26 |
| 11,001,285 | B1* | 5/2021 | Gayk | B62B 1/042 |
| 11,097,759 | B1* | 8/2021 | Poudrier | B62B 3/108 |
| 2003/0047895 | A1* | 3/2003 | McElroy | B23D 45/048 280/79.3 |

(Continued)

FOREIGN PATENT DOCUMENTS

WO    WO2004050309    6/2004

*Primary Examiner* — Bryan A Evans (57) ABSTRACT

A wheeled saw support apparatus for creating horizontal cuts in drywall and other vertical surfaces includes a base platform and a plurality of wheels is coupled to a base bottom side. A pair of side supports is coupled to a base top side adjacent a base front side. The pair of side supports comprises a left side support and a right side support coupled adjacent a base left side and a base right side, respectively. A pair of crossbars is coupled to the pair of side supports with each crossbar extending between a support inner side of each side support. A plurality of mounting clamps is coupled to the pair of crossbars. The plurality of mounting clamps secures a circular saw to the pair of crossbars.

12 Claims, 8 Drawing Sheets

(56) References Cited

U.S. PATENT DOCUMENTS

| 2009/0058027 A1* | 3/2009 | Huang | B65F 1/0033 |
| | | | 280/47.35 |
| 2014/0216228 A1* | 8/2014 | Zeiler | B23D 45/003 |
| | | | 83/483 |
| 2015/0096953 A1* | 4/2015 | Lai | A47B 47/024 |
| | | | 211/186 |

* cited by examiner

WHEELED SAW SUPPORT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to saw devices and more particularly pertains to a new saw device for creating horizontal cuts in drywall and other vertical surfaces.

(2) Description of Related Art Including Information Disclosed Under 37 CFR 1.97 and 1.98

The prior art relates to saw devices and particularly saw devices with wheels. Existing devices typically utilize wheels to ease transportation of the tool, where it is then used stationary. These devices are not intended to be wheeled while cutting. Vertical cuts in a drywall may be easily performed with a handheld circular saw against a guide because the guide may rest on the floor and no substantial force is applied to the guide by the saw. Horizontal cuts, however, require the guide to be secured in place and are thus difficult to perform without damaging the wall or surface being cut.

BRIEF SUMMARY OF THE INVENTION

An embodiment of the disclosure meets the needs presented above by generally comprising a base platform having a base top side, a base bottom side, a base front side, a base back side, a base left side, and a base right side. A plurality of wheels is coupled to the base bottom side. A pair of side supports is coupled to the base top side adjacent the base front side. The pair of side supports comprises a left side support and a right side support coupled adjacent the base left side and the base right side, respectively. A pair of crossbars is coupled to the pair of side supports with each crossbar extending between a support inner side of each side support. A plurality of mounting clamps is coupled to the pair of crossbars. The plurality of mounting clamps is configured to secure a circular saw to the pair of crossbars.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
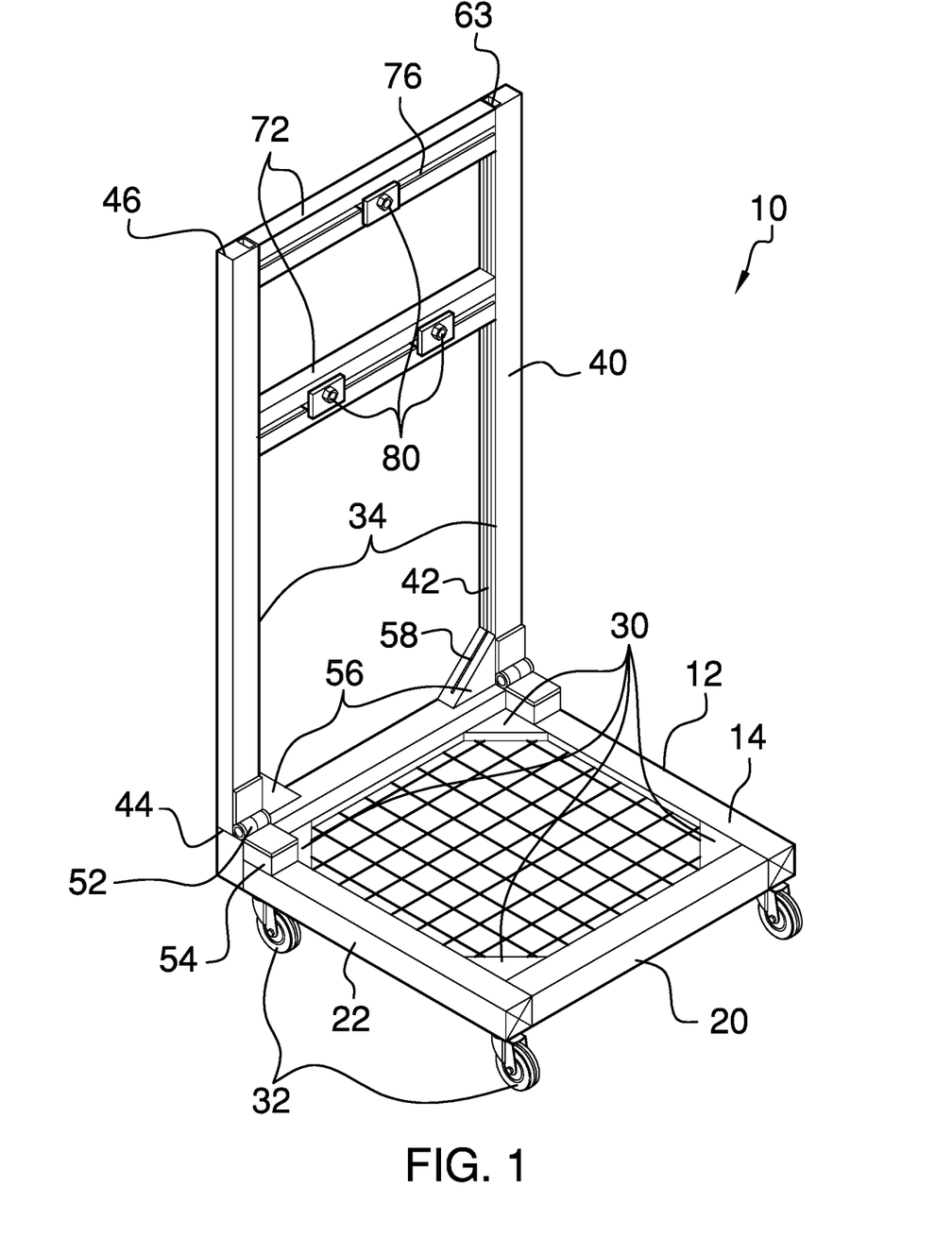
FIG. 1 is an isometric view of a wheeled saw support apparatus according to an embodiment of the disclosure.
Figure 2:
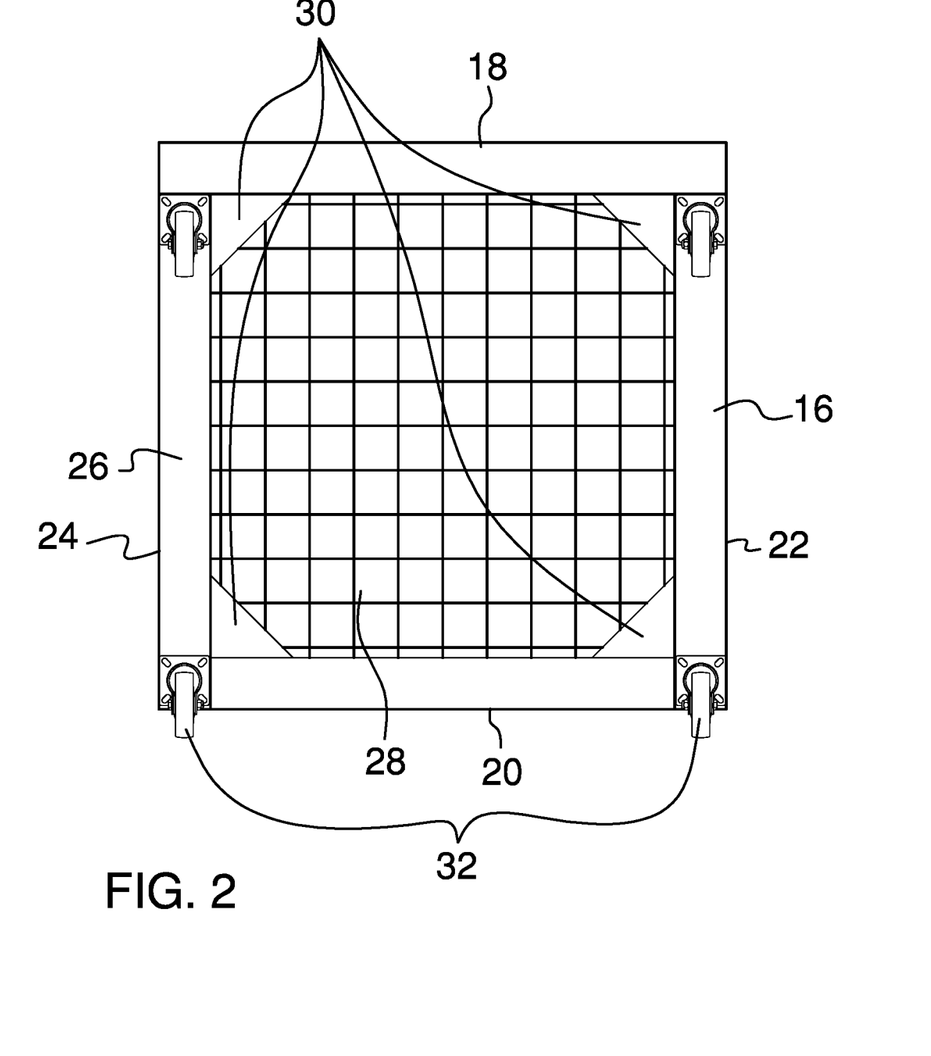
FIG. 2 is a bottom plan view of an embodiment of the disclosure.
Figure 3:
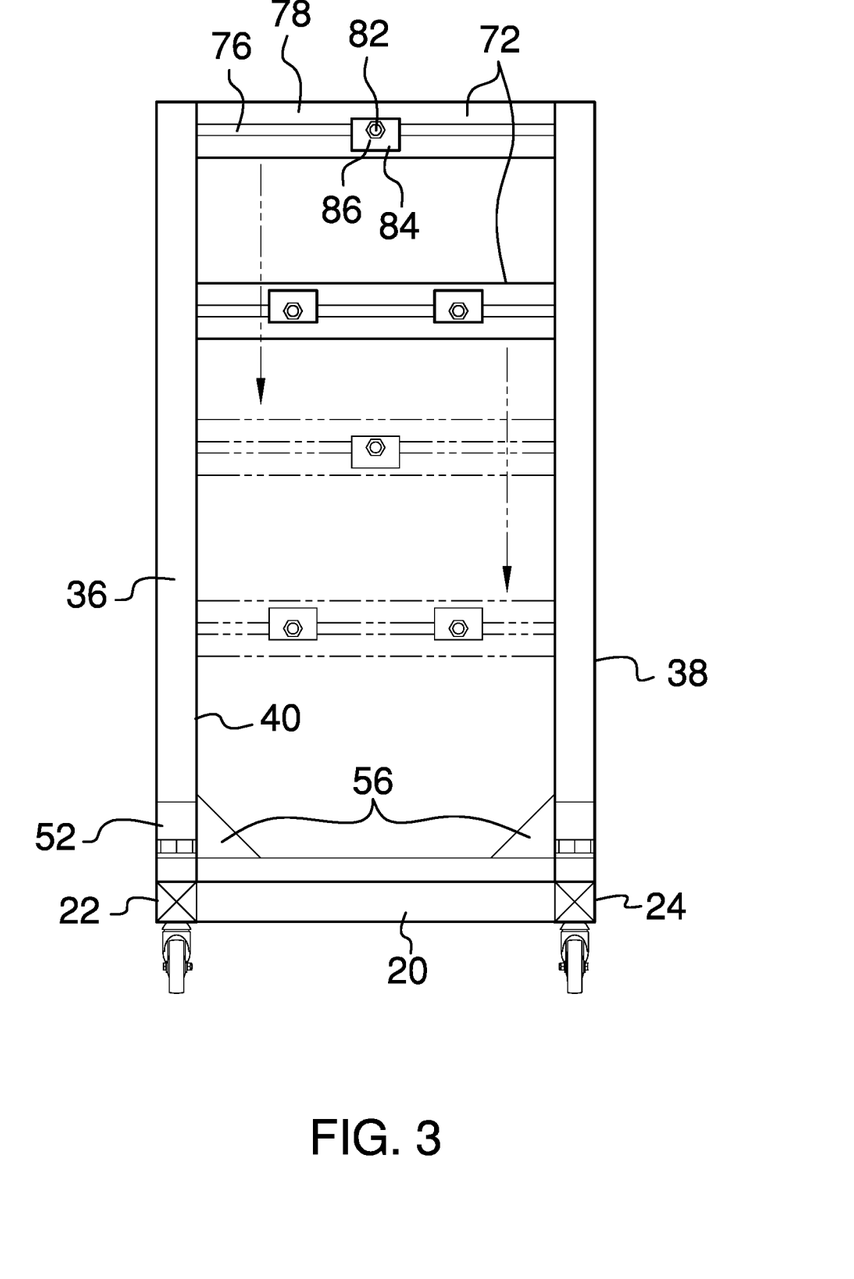
FIG. 3 is a front elevation view of an embodiment of the disclosure.
Figure 4:
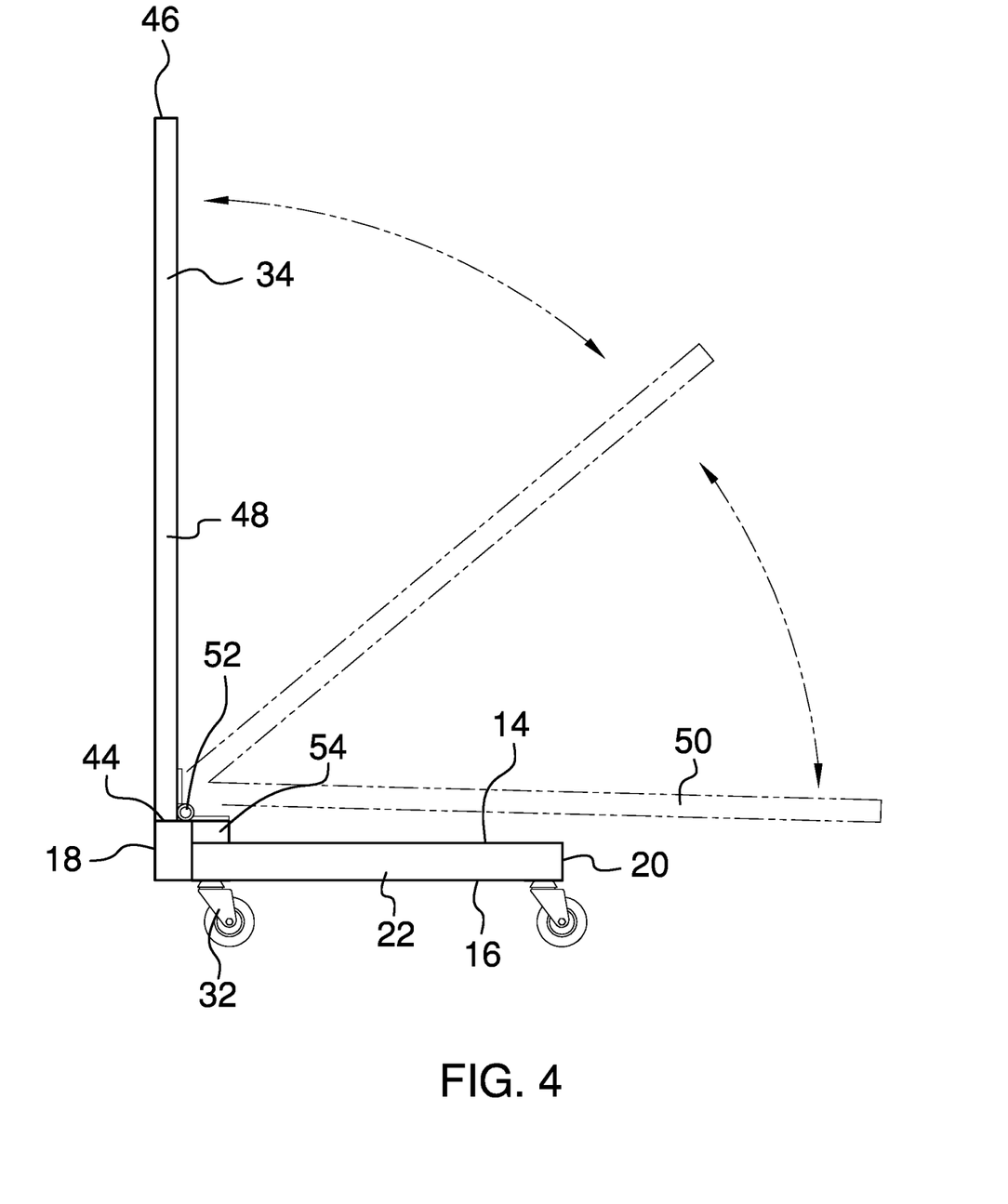
FIG. 4 is a side elevation view of an embodiment of the disclosure.
Figure 5:
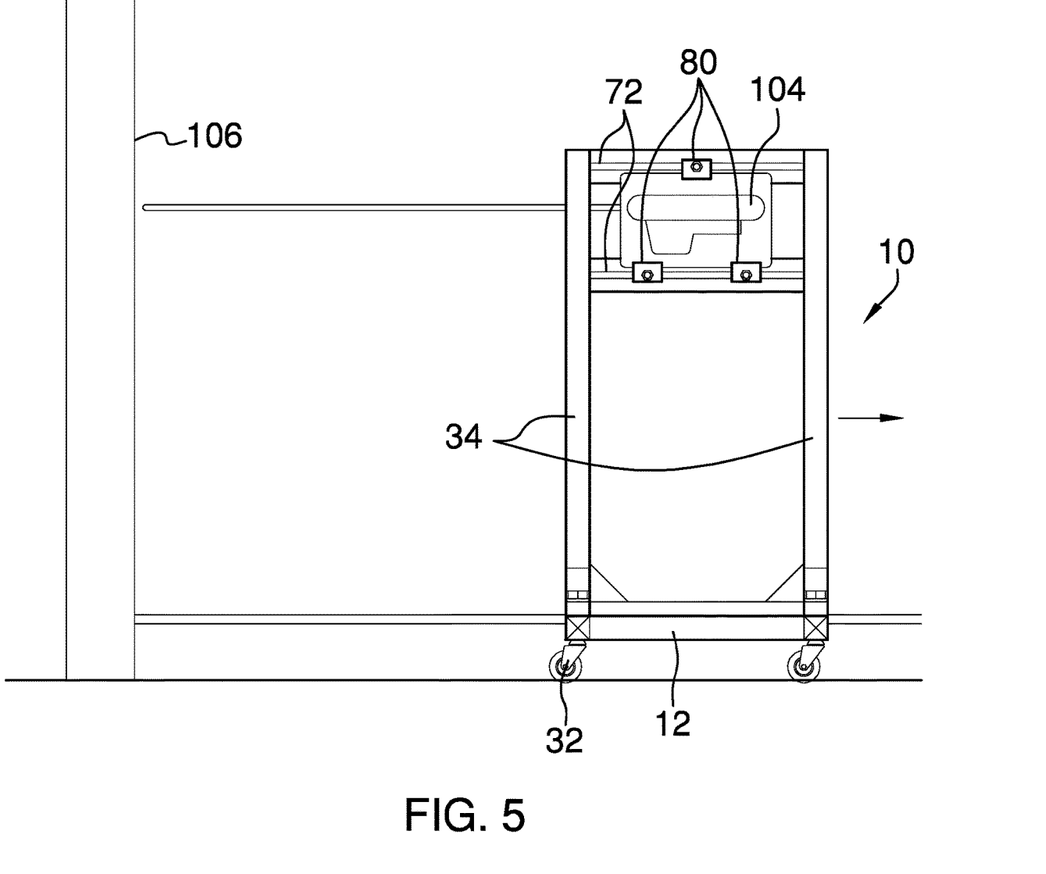
FIG. 5 is an in-use view of an embodiment of the disclosure.
Figure 6:
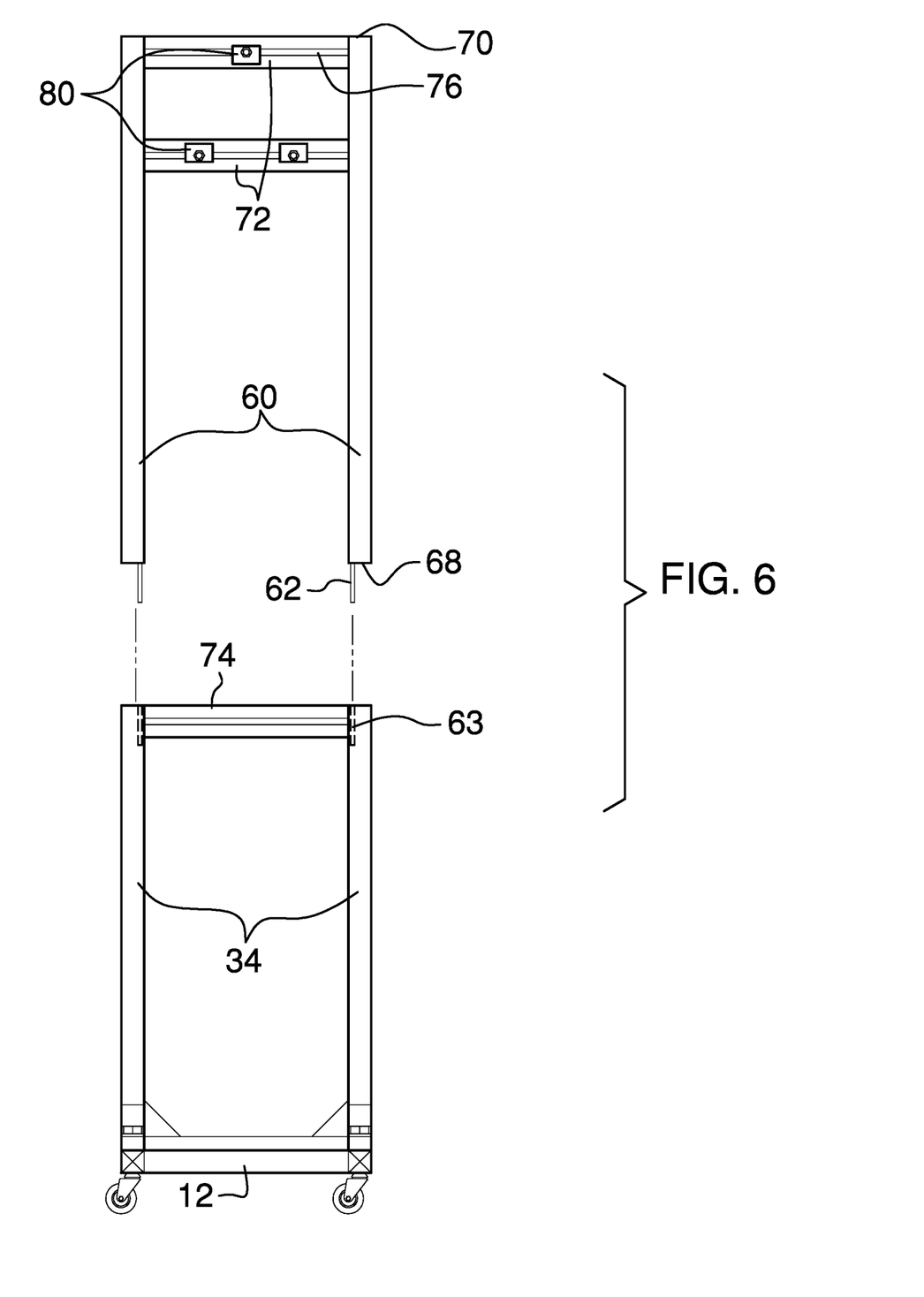
FIG. 6 is a front elevation view of an embodiment of the disclosure.
Figure 7:
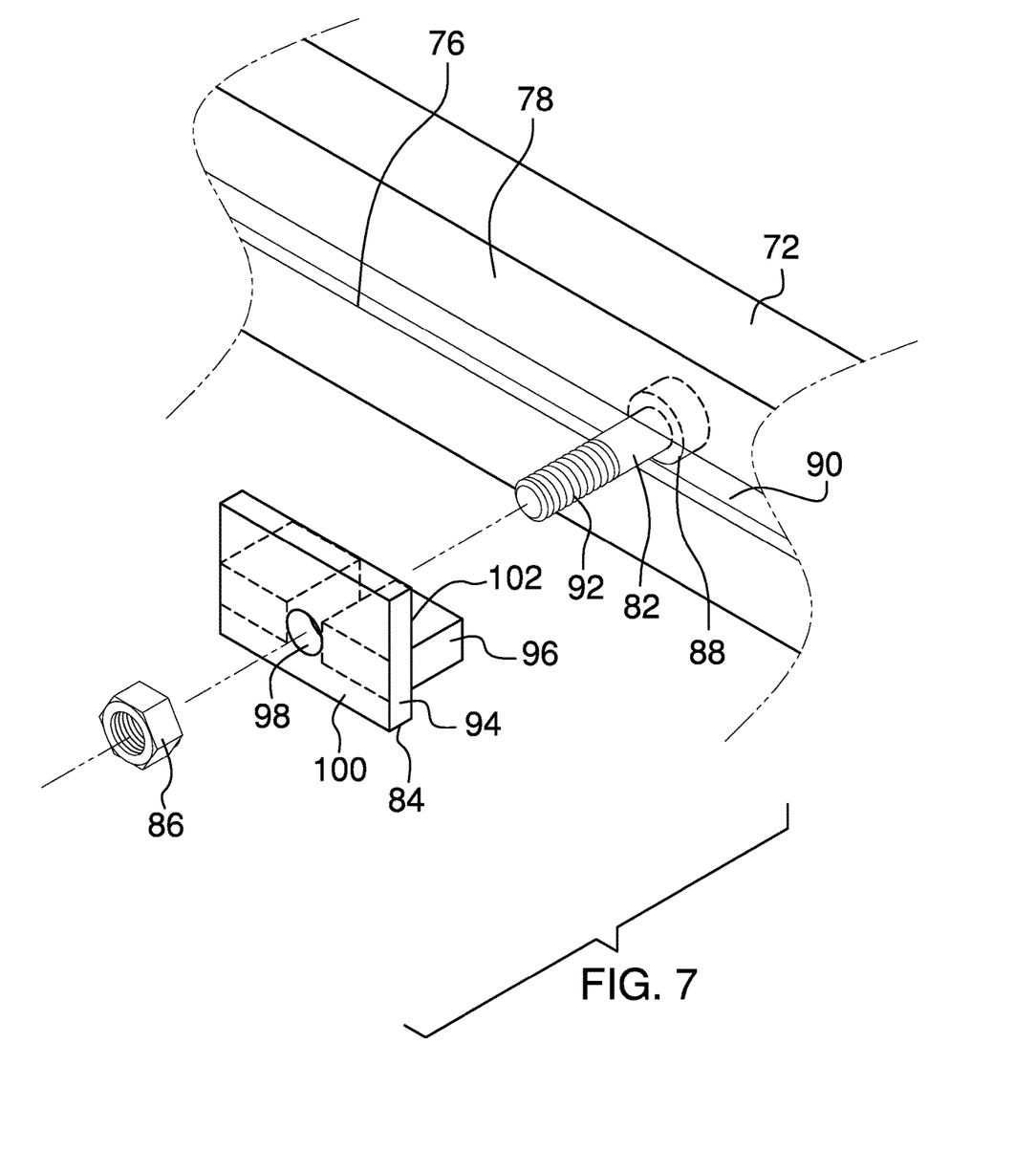
FIG. 7 is a detail view of an embodiment of the disclosure.
Figure 8:
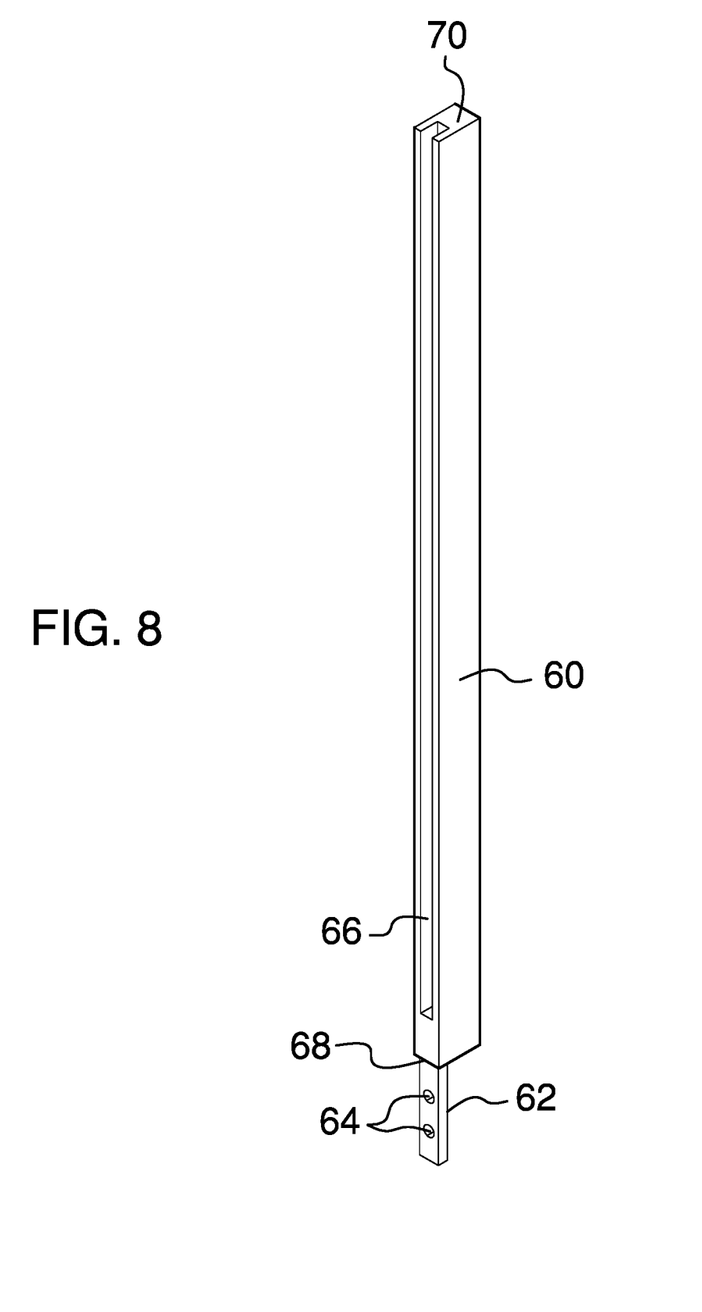
FIG. 8 is a detail view of an embodiment of the disclosure.

With reference now to the drawings, and in particular to FIGS. 1 through 8 thereof, a new saw device embodying the principles and concepts of an embodiment of the disclosure and generally designated by the reference numeral 10 will be described.

As best illustrated in FIGS. 1 through 8, the wheeled saw support apparatus 10 generally comprises a base platform 12 having a base top side 14, a base bottom side 16, a base front side 18, a base back side 20, a base left side 22, and a base right side 24. The base platform 12 may include a perimeter portion 26 and a central portion 28. The central portion 28 may be a wire mesh and the perimeter portion 26 may be a squared tube to reduce weight of the apparatus 10. The base platform 12 may include a plurality of triangular base gussets 30 coupled to the perimeter portion 26 to strengthen the base platform 12. The central portion 28 is coupled to the plurality of triangular base gussets 30. A plurality of wheels 32 is coupled to the base bottom side 16. The plurality of wheels 32 may be a set of four wheels 32. Each wheel 32 may be a multi-directional castor or may be restricted to only allow movement along an axis parallel to the base front side 18.

A pair of side supports 34 is coupled to the base top side 14 adjacent the base front side 18. The pair of side supports 34 may comprise a left side support 36 and a right side support 38 coupled adjacent the base left side 22 and the base right side 24, respectively. A support inner side 40 of each side support may have a support channel 42 extending from a support bottom side 44 to a support top side 46 of each side support. The pair of side supports 34 may be hingingly coupled to the base top side 14 and moves between an extended position 48 perpendicular to the base top side 14 and a folded position 50 adjacent the base top side 14. Each side support 34 may have a hinge 52. The base front side 18 may be thicker than the rest of the perimeter portion 26, in which case each hinge 52 also has a hinge support 54 coupled to the respective base left side 22 or base right side 24.

A pair of triangular support gussets 56 may be coupled to the base top side 14 adjacent the pair of side supports 34. The pair of triangular support gussets 56 is selectively engageable with the pair of side supports 34 to secure the side supports 34 in either the extended position 48 for use or the folded position 50 for transport. Each triangular support gusset 56 may have a gusset slot 58 to receive an engagement member to engage the support channel 42.

There may be a pair of support extensions 60 to allow the apparatus 10 to make higher cuts. Each support extension 60 has an extension adaptor 62 to selectively engageable within an adaptor aperture 63 of the support top side 46 of each side support. The extension adaptor 62 may have a plurality of engagement apertures 64 to receive hardware and prevent separation from the respective side support 34. Each support extension 60 has an extension channel 66 extending from an extension bottom side 68 to an extension top side 70 and conforming to the respective support channel 42.

A pair of crossbars 72 is coupled to the pair of side supports 34. The pair of crossbars 72 is slidably coupled within the support channel 42 of each side support and the extension channel 66 of each support extension. A third crossbar 74 may be engaged when the pair of support extensions 60 is in use for improved stability. Each crossbar 72 has a crossbar channel 76 extending through a crossbar mount side 78.

A plurality of mounting clamps 80 is coupled to the pair of crossbars 72. Each mounting clamp 80 is slidably coupled to the crossbar channel 76. Each mounting clamp 80 may comprise a bolt 82, a clamp head 84, and a nut 86. The bolt 82 has a bolt head 88 positioned within a crossbar inside portion 90 of the crossbar channel and a bolt shaft 92 extending from the bolt head 88 through the crossbar channel 76. The bolt 82 is thus slidable within the crossbar channel 76 without being removable while the crossbar 72 is coupled to the pair of side supports 34 or the pair of support extensions 60.

The clamp head 84 may comprise a clamp base 94 and a pair of clamp guides 96. The clamp base 94 has a through hole 98 extending from a clamp outer side 100 to a clamp inner side 102 and slidingly receiving the bolt shaft 92. The pair of clamp guides 96 is coupled to the clamp inner side 102 adjacent the through hole 98. The clamp base 94 may be rectangular prismatic and each clamp guide 96 may be rectangular prismatic and perpendicularly extending from the clamp inner side 102. The pair of clamp guides 96 slidingly engages the crossbar channel 76. The nut 86 threadably engages with the bolt shaft 92 to secure the clamp head 84 to the crossbar 72. The plurality of mounting clamps 80 is configured to secure a circular saw 104 to the pair of crossbars 72.

In use, the pair of side supports 34 is secured in the extended position 48. The circular saw 104 is mounted to the pair of crossbars 72 horizontally and the base front side 18 is pushed against a wall 106 or other vertical surface to be cut. The circular saw 104 is then powered on and engaged with the wall 106 and the apparatus 10 is rolled on the plurality of wheels 32 to create a straight, horizontal cut.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A wheeled saw support apparatus comprising:
    a base platform having a base top side, a base bottom side, a base front side, a base back side a base left side and a base right side;
    a plurality of wheels coupled to the base bottom side;
    a pair of side supports coupled to the base top side adjacent the base front side, the pair of side supports comprising a left side support and a right side support coupled adjacent the base left side and the base right side, respectively;
    a pair of crossbars coupled to the pair of side supports, each crossbar extending between a support inner side of each side support;
    a plurality of mounting, clamps coupled to the pair of crossbars, the plurality of mounting clamps being configured to secure a circular saw to the pair of crossbars; and
    the support inner side of each side support having a support channel, the pair of crossbars being slidably coupled within the support channel of each side support.

2. The wheeled saw support apparatus of claim 1 further comprising each support channel extending from a support bottom side to a support top side of each side support.

3. A wheeled saw support apparatus comprising:
    a base platform having a base top side, a base bottom side, a base front side, a base back side, a base left side, and a base right side;
    a plurality of wheels coupled to the base bottom side;
    a pair of side supports coupled to the base top side adjacent the base front side, the pair of side supports comprising a left side support and a right side support coupled adjacent the base left side and the base right side, respectively;
    a pair of crossbars coupled to the pair of side supports, each crossbar extending between a support inner side of each side support;

a plurality of mounting clamps coupled to the pair of crossbars, the plurality of mounting clamps being configured to secure a circular saw to the pair of crossbars; and the pair of side supports being hingingly coupled to the base top side and moving between an extended position perpendicular to the base top side and a folded position adjacent the base top side.

4. A wheeled saw support apparatus comprising:

a base platform having a base top side, a base bottom side, a base front side, a base back side, a base left side, and a base right side;

a plurality of wheels coupled to the base bottom side;

a pair of side supports coupled to the base top side adjacent the base front side, the pair of side supports comprising a left side support and a right side support coupled adjacent the base left side and the base right side, respectively;

a pair of crossbars coupled to the pair of side supports, each crossbar extending between a support inner side of each side support;

a plurality of mounting clamps coupled to the pair of crossbars, the plurality of mounting clamps being configured to secure a circular saw to the pair of crossbars; and each crossbar having a crossbar channel extending through a crossbar mount side; each mounting clamp being slidably coupled to the crossbar channel.

5. The wheeled saw support apparatus of claim 4 further comprising each mounting clamp comprising a bolt, a clamp head, and a nut, the bolt having a bolt head positioned within a crossbar inside portion of the crossbar channel and a bolt shaft extending from the bolt head through the crossbar channel, the clamp head having a clamp base having a through hole extending from a clamp outer side to a clamp inner side and slidingly receiving the bolt shaft and a pair of clamp guides coupled to the clamp inner side adjacent the through hole, the pair of clamp guides slidingly engaging the crossbar channel, the nut being threadably engageable with the bolt shaft to secure the clamp head to the crossbar.

6. The wheeled saw support apparatus of claim 5 further comprising the clamp base being rectangular prismatic and each clamp guide being rectangular prismatic, the pair of clamp guides perpendicularly extending from the clamp inner side.

7. A wheeled saw support apparatus comprising:

a base platform having a base top side, a base bottom side, a base front side, a base back side, a base left side, and a base right side;

a plurality of wheels coupled to the base bottom side;

a pair of side supports coupled to the base top side adjacent the base front side, the pair of side supports comprising a left side support and a right side support coupled adjacent the base left side and the base right side, respectively;

a pair of crossbars coupled to the pair of side supports, each crossbar extending between a support inner side of each side support;

a plurality of mounting clamps coupled to the pair of crossbars, the plurality of mounting clamps being configured to secure a circular saw to the pair of crossbars; and the base platform including a perimeter portion and a central portion, the central portion being a wire mesh.

8. The wheeled saw support apparatus of claim 7 further comprising a plurality triangular base gussets coupled to the perimeter portion, the central portion being coupled to the plurality of triangular base gussets.

9. A wheeled saw support apparatus comprising:

a base platform having a base top side, a base bottom side, a base front side, a base back side, a base left side, and a base right side;

a plurality of wheels coupled to the base bottom side, a pair of side supports coupled to the base top side adjacent the base front side, the pair of side supports comprising a left side support and a right side support coupled adjacent the base left side and the base right side, respectively;

a pair of crossbars coupled to the pair of side supports, each crossbar extending between a support inner side of each side support;

a plurality of mounting clamps coupled to the pair of crossbars, the plurality of mounting clamps being configured to secure a circular saw to the pair of crossbars; and a pair of triangular support gussets coupled to the base top side, the pair of triangular support gussets being selectively engageable with the pair of side supports.

10. A wheeled saw support apparatus comprising:

a base platform having a base top side, a base bottom side, a base front side, a base back side, a base left side, and a base right side;

a plurality of wheels coupled to the base bottom side;

a pair of side supports coupled to the base top side adjacent the base front side, the pair of side supports comprising a left side support and a right side support coupled adjacent the base left side and the base right side, respectively;

a pair of crossbars coupled to the pair of side supports, each crossbar extending between a support inner side of each side support;

a plurality of mounting clamps coupled to the pair of crossbars, the plurality of mounting clamps being configured to secure a circular saw to the pair of crossbars; and a pair of support extensions, the pair of support extensions being selectively engageable with the pair of side supports.

11. The wheeled saw support apparatus of claim 10 further comprising each support extension having an extension adaptor, the extension adaptors being selectively engageable within an adaptor aperture of each side support.

12. A wheeled saw support apparatus comprising:

a base platform having a base top side, a base bottom side, a base front side, a base back side, a base left side, and a base right side, the base platform including a perimeter portion and a central portion, the central portion being a wire mesh, the base platform including a plurality triangular base gussets coupled to the perimeter portion, the central portion being coupled to the plurality of triangular base gussets;

a plurality of wheels coupled to the base bottom side;

a pair of side supports coupled to the base top side adjacent the base front side, the pair of side supports comprising a left side support and a right side support coupled adjacent the base left side and the base right side, respectively, a support inner side of each side support having a support channel extending from a support bottom side to a support top side of each side support, the pair of side supports being hingingly coupled to the base top side and moving between an extended position perpendicular to the base top side and a folded position adjacent the base top side;

a pair of triangular support gussets coupled to the base top side, the pair of triangular support gussets being selectively engageable with the pair of side supports;

a pair of support extensions, each support extension having an extension adaptor, the extension adaptors being selectively engageable within an adaptor aperture of the support top side of each side support, each support extension having an extension channel extending from an extension bottom side to an extension top side;

a pair of crossbars coupled to the pair of side supports, the pair of crossbars being slidably coupled within the support channel of each side support and the extension channel of each support extension, each crossbar having a crossbar channel extending through a crossbar mount side; and a plurality of mounting clamps coupled to the pair of crossbars, each mounting clamp being slidably coupled to the crossbar channel, each mounting clamp comprising a bolt, a clamp head, and a nut, the bolt having a bolt head positioned within a crossbar inside portion of the crossbar channel and a bolt shaft extending from the bolt head through the crossbar channel, the clamp head having a clamp base having a through hole extending from a clamp outer side to a clamp inner side and slidingly receiving the bolt shaft and a pair of clamp guides coupled to the clamp inner side adjacent the through hole, the clamp base being rectangular prismatic and each clamp guide being rectangular prismatic, the pair of clamp guides perpendicularly extending from the clamp inner side, the pair of clamp guides slidingly engaging the crossbar channel, the nut being threadably engageable with the bolt shaft to secure the clamp head to the crossbar the plurality of mounting clamps being configured to secure a circular saw to the pair of crossbars.

* * * * *